(12) United States Patent
Chen

(10) Patent No.: US 10,562,821 B2
(45) Date of Patent: Feb. 18, 2020

(54) TOUGHENED CERAMIC MATERIAL

(71) Applicant: National Tsing Hua University, Hsinchu (TW)

(72) Inventor: Swe-Kai Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 15/962,101

(22) Filed: Apr. 25, 2018

(65) Prior Publication Data

US 2019/0152865 A1 May 23, 2019

(30) Foreign Application Priority Data

Nov. 23, 2017 (TW) .............................. 106140767 A

(51) Int. Cl.
| | |
|---|---|
| *C04B 35/58* | (2006.01) |
| *C04B 35/56* | (2006.01) |
| *C04B 35/563* | (2006.01) |
| *C04B 35/565* | (2006.01) |
| *C04B 35/653* | (2006.01) |
| *C04B 35/657* | (2006.01) |
| *C04B 35/63* | (2006.01) |

(52) U.S. Cl.
CPC ...... *C04B 35/58071* (2013.01); *C04B 35/563* (2013.01); *C04B 35/565* (2013.01); *C04B 35/5611* (2013.01); *C04B 35/5626* (2013.01); *C04B 35/58064* (2013.01); *C04B 35/58078* (2013.01); *C04B 35/6303* (2013.01); *C04B 35/653* (2013.01); *C04B 35/657* (2013.01); *C04B 2235/3813* (2013.01); *C04B 2235/3821* (2013.01); *C04B 2235/3826* (2013.01); *C04B 2235/3839* (2013.01); *C04B 2235/3843* (2013.01); *C04B 2235/3847* (2013.01); *C04B 2235/404* (2013.01); *C04B 2235/61* (2013.01); *C04B 2235/6581* (2013.01); *C04B 2235/80* (2013.01); *C04B 2235/96* (2013.01)

(58) Field of Classification Search
CPC ........ C04B 35/58064; C04B 35/58071; C04B 35/58078

See application file for complete search history.

(56) References Cited

U.S. PATENT DOCUMENTS

| | | | | |
|---|---|---|---|---|
| 6,171,989 | B1 * | 1/2001 | Yoshida | A44C 27/003 501/93 |
| 2010/0122903 | A1 * | 5/2010 | Landwehr | C01B 35/04 204/281 |
| 2015/0143953 | A1 * | 5/2015 | Chen | C22C 29/005 75/239 |
| 2016/0145723 | A1 * | 5/2016 | Chen | C22C 29/02 75/239 |
| 2017/0217839 | A1 * | 8/2017 | Chen | C22C 1/0491 |
| 2017/0260102 | A1 * | 9/2017 | Conway | C04B 35/563 |
| 2018/0179617 | A1 * | 6/2018 | Chen | C22C 29/14 |
| 2018/0290934 | A1 * | 10/2018 | Chen | C04B 35/5611 |

* cited by examiner

*Primary Examiner* — Karl E Group
(74) *Attorney, Agent, or Firm* — Locke Lord LLP; Tim Tingkang Xia, Esq.

(57) ABSTRACT

A toughened ceramic material includes at least one boride and a refractory metal, or at least two borides, one carbide at least, and a refractory metal. The toughened ceramic material is by means of heating and smelting the above materials. During the process of preparing the toughened ceramic material by heating and smelting, substantially all the refractory metal reacts with the boride and/or the carbide to form a toughened ceramic material with a high toughness and substantially without metallic cemented phase.

1 Claim, 15 Drawing Sheets

US 10,562,821 B2

TOUGHENED CERAMIC MATERIAL

CROSS REFERENCE TO RELATED APPLICATION

This application claims the benefit of Taiwan Patent Application Serial No. 106140767, filed on Nov. 23, 2017, the subject matter of which is incorporated herein by reference.

BACKGROUND OF THE INVENTION

1. Field of the Invention

The disclosure is related to a toughened ceramic material, and, more particularly, to a toughened ceramic material with a high toughness and a pure ceramic structure while the disclosed toughened ceramic material is prepared by heating and smelting at least one boride and a refractory metal or at least two borides, at least one carbide and a refractory metal.

2. Descriptions of the Related Art

Cemented carbides are such as composites composed of WC and Co. In the early 1900s, Henri Moissan artificially synthesized tungsten carbide (WC). Tungsten carbide has a high hardness, designed for replacing diamond. However, tungsten carbide is brittle and porous, such that is it not suitable in engineering. In 1923, Schröter and Baumhauer observed that after sintered with cobalt or nickel, tungsten carbide can maintain the hardness of ceramics and has toughness near metals. Thus, it is beneficial in mold industry. The material can be widely used in cutting tools, mineral extractions and military weapons. About 60% of W involves in producing cemented carbides. In 1930, the demand was 10 tons, while the demand increases by 5000 times to 50,000 tons in 2008.

Cemented carbides are composed of a strengthening phase and a cemented phase. As described above, WC having with high melting point and high toughness as well as good wear resistance functions as a strengthening phase. Meanwhile, Co functions as a cemented phase because of its high electrical and thermal conductivity as well as its high toughness, which is the most important property to render the composite not brittle. In recent studies, hard metals, such as WC and Co, are used as the base, when TiC, TaC and so forth are also developed from the strengthening phase, and Mo, Ni, Fe and so forth are developed from the cemented phase. These materials are the cermet composites. Traditional hard metals and cermets are sintered composites, and a minute amount of the cemented phase incorporates. However, the density of the composite is another problem for the cemented carbide prepared by the traditional sintering described above, let alone the complexity and expense of the preparation and the limited operating temperature of the composite.

During the preparation of the toughened ceramic material, if the refractory metal can only react with the boride or/and the carbide during heating and smelting according to different planned composition ratios, a pure ceramic structure with a high toughness is substantially formed without a metallic cemented phase.

SUMMARY OF THE INVENTION

Disclosed is a toughened ceramic material. The disclosed toughened ceramic material may include at least one boride and a refractory metal, wherein the boride selected is from the group consisting of $TiB_2$, $ZrB_2$, $NbB_2$, $HfB_2$, $TaB_2$ and $W_2B_5$, and the refractory metal is tungsten or tantalum. The disclosed toughened ceramics are by means of heating and smelting the boride and the refractory metal.

In one embodiment, during the process of preparing the toughened ceramic material by heating and smelting the boride and the refractory metal, substantially all the refractory metal reacts with the boride, such that a pure ceramic structure is substantially formed without any metallic cemented phase.

In another embodiment, the toughened ceramic material may include $MB_2$ phase, MB phase or/and $W_2B$ phase.

A toughened ceramic material is disclosed. The composition of the toughened ceramic material comprises at least two borides, least one carbide and a refractory metal, wherein the boride is selected from the group consisting of $TiB_2$ and $ZrB_2$, the carbide is selected from the group consisting of SiC, $B_4C$, TiC, NbC, TaC and WC, the refractory metal is tungsten. The toughened ceramics are by means of heating and smelting the boride, the carbide and the refractory metal.

In one embodiment, during the process of preparing the toughened ceramic material by heating and smelting the boride, the carbide and the refractory metal, substantially all the refractory metal reacts with the boride and/or the carbide, such that metallic cemented phase virtually appears nowhere, which may result in the pure ceramic structure.

In another embodiment, the microstructure of the toughened ceramic material is composed of $MB_2$ phase, MC phase, MB phase or/and $W_2B$ phase.

DETAILED DESCRIPTION OF THE PREFERRED EMBODIMENTS

The technical solutions, features and effects of the disclosure are clearly the description of disclosed embodiments with reference to the drawings.

Figure 1:
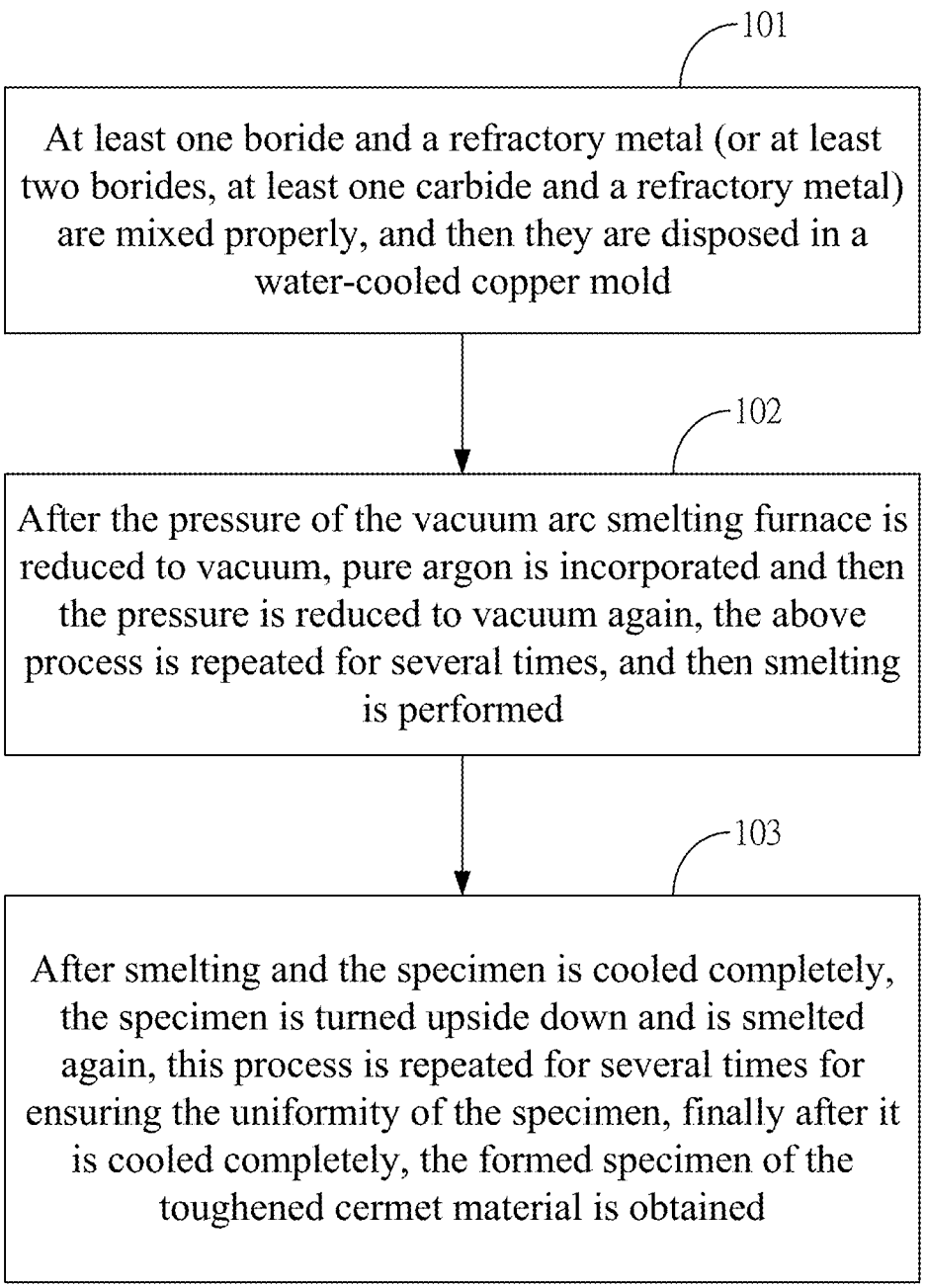
FIG. 1 is a flow chart of the process for preparing the toughened ceramic material of the disclosure.

Referring to FIG. 1, the preparation is as the following:

(1) At least one boride and a refractory metal (or at least two borides, one or more carbide, and a refractory metal) are mixed properly, and then the mixed could be disposed in a groove of a water-cooled copper mold of a vacuum arc the smelting furnace (101);

(2) After the pressure of the vacuum arc smelting furnace reduces to vacuum (the pressure of the furnace is $2.4 \times 10^{-2}$ torr), pure argon (Ar) incorporates until the pressure elevates to about 8.0 torr, and then the pressure reduces to vacuum again (reduced to $2.4 \times 10^{-2}$ ton). The process of incorporating Ar and then reducing the pressure is "purge". The above process repeats for several times; and then argon incorporates until the pressure is back to about 8.0 torr and smelting is performing (102); and (3) After the performance of smelting and the specimen completely cools, the specimen repeats turning upside down and smelting again. This process repeats for several times to ensure the uniformity of the specimen. As the above was done and the specimen is completely cooled one more time, the pressure of the furnace is elevated to 1 atm; and the formed specimen of the toughened cermet material is obtained (103).

Figure 2:
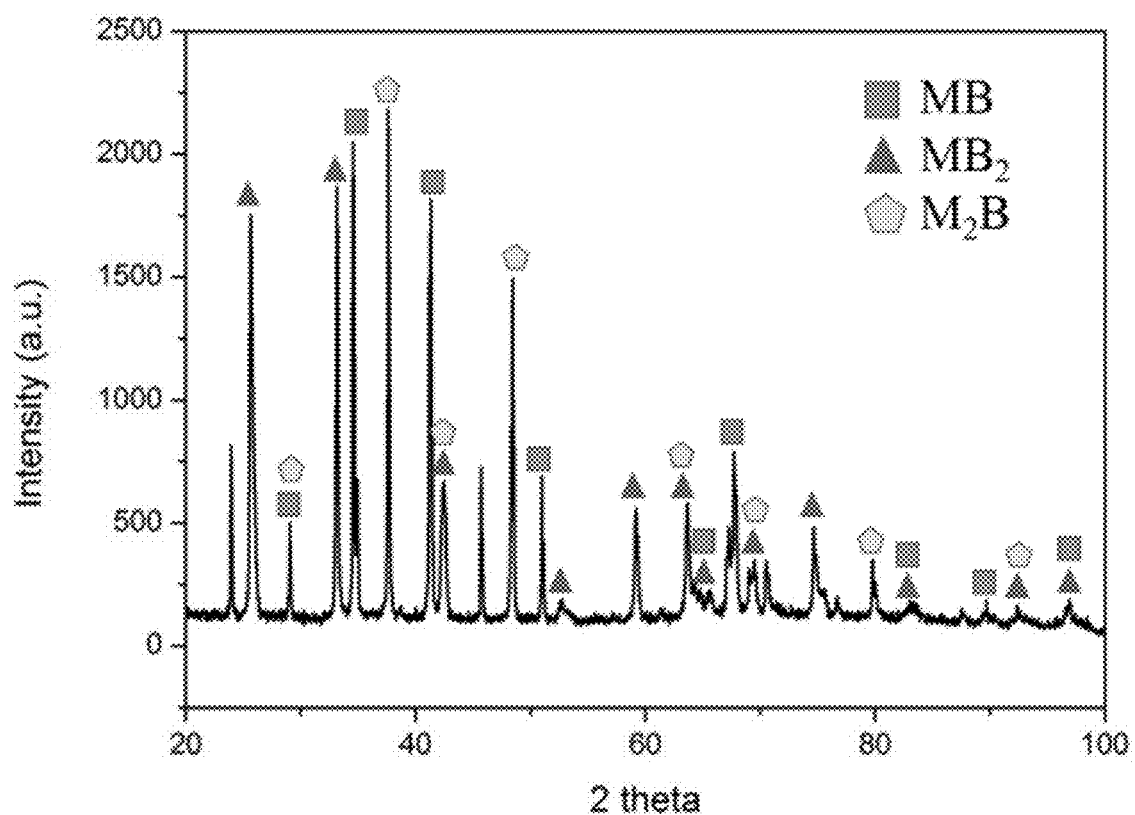
FIG. 2 is a schematic view of the XRD analysis of the toughened ceramic material according to the first embodiment of the disclosure.

The composition of the first embodiment (B1B2+Ta) is $(TiB_2)_{0.3}(ZrB_2)_{0.3}Ta_{0.4}$, and the XRD analysis is shown in FIG. 2, which is indicative of the phase composition of MB, $MB_2$ and $M_2B$ with the peaks, without significant signals of cemented phase Ta solid solution. In other words, the toughened ceramic material disclosed in the first embodiment is substantially a pure ceramic. The fraction of $M_2B$ phase is high, such that its mechanical properties are hard and brittle, the hardness is 1842±74 HV, and the fracture toughness is 6.44±0.99 MPa $m^{1/2}$.

Figure 3:
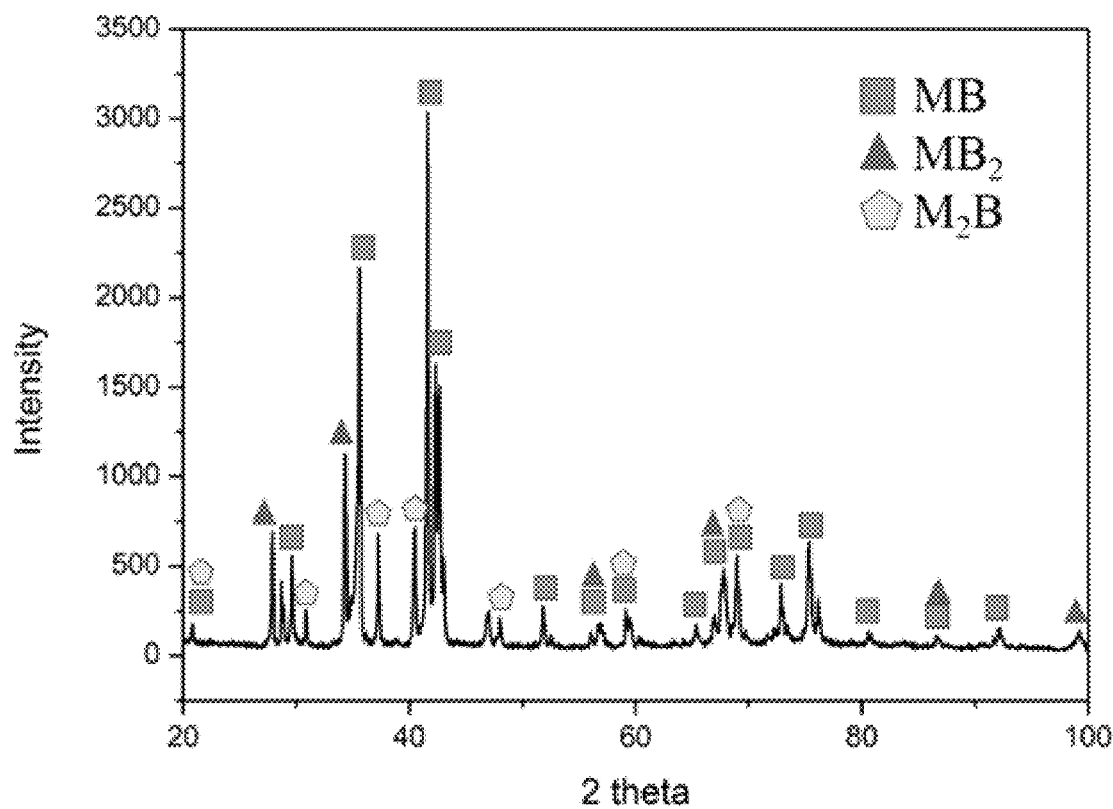
FIG. 3 is a schematic view of the XRD analysis of the toughened ceramic material according to the second embodiment of the disclosure.

The composition of the second embodiment (SB4) is $(NbB_2)_{0.6}W_{0.4}$, and the corresponding XRD analysis is shown in FIG. 3, which shows three phases, i.e. $M_2B$, MB and $MB_2$ with three peak patterns, respectively. Since almost all the W in the second embodiment reacts with B and forms MB or $M_2B$, the formed pure ceramic structure is without the cemented phase of the refractory metal. In this embodiment the hardness is 1944±56 HV and the toughness is 7.72±0.72 MPa $m^{1/2}$.

Figure 4:
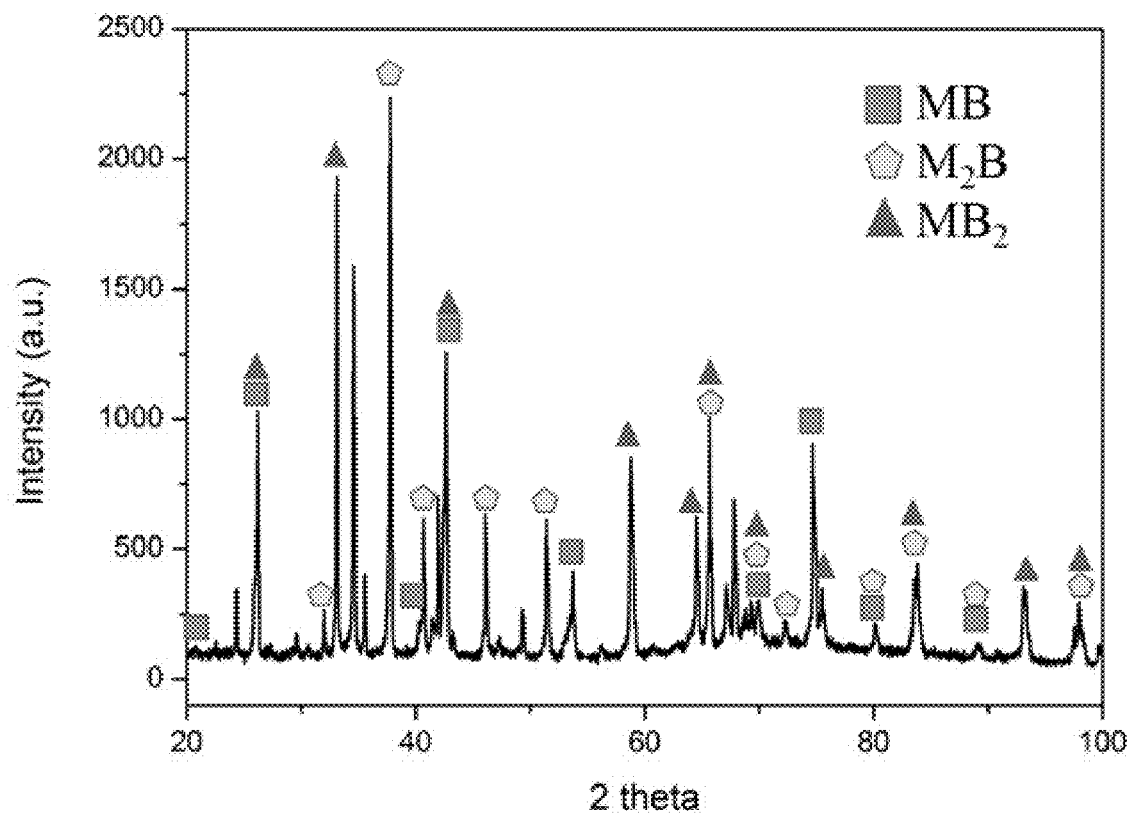
FIG. 4 is a schematic view of the XRD analysis of the toughened ceramic material according to the third embodiment of the disclosure.

The composition of the third embodiment (B3B5) is $[(HfB_2)(TaB_2)]_{0.6}W_{0.4}$, and the corresponding XRD analysis is shown in FIG. 4. Three peak patterns in FIG. 4 correspond to three phases, i.e. $M_2B$, MB and $MB_2$, respectively. In the third embodiment, the hardness is 1911±93 HV, and the fracture toughness is 5.12±0.34 MPa $m^{1/2}$.

Figure 5:
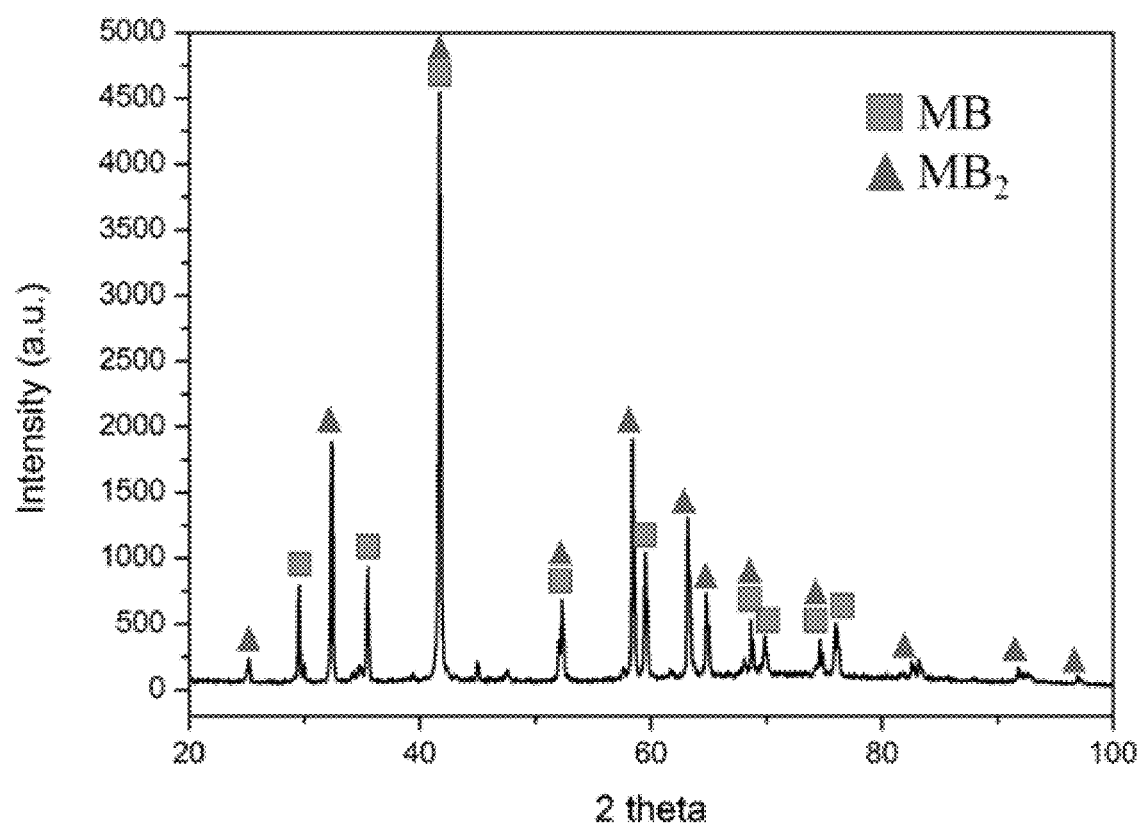
FIG. 5 is a schematic view of the XRD analysis of the toughened ceramic material according to the fourth embodiment of the disclosure.

The composition of the fourth embodiment (B3B6) is $[(HfB_2)(W_2B_5)_{0.5}]_{0.6}W_{0.4}$, and the corresponding XRD analysis is shown in FIG. 5. Two peak patterns correspond to two phases of MB and $MB_2$, respectively. The fourth embodiment has hardness of 1841±87 HV, and its fracture toughness is 5.66±0.34 MPa $m^{1/2}$.

Figure 6:
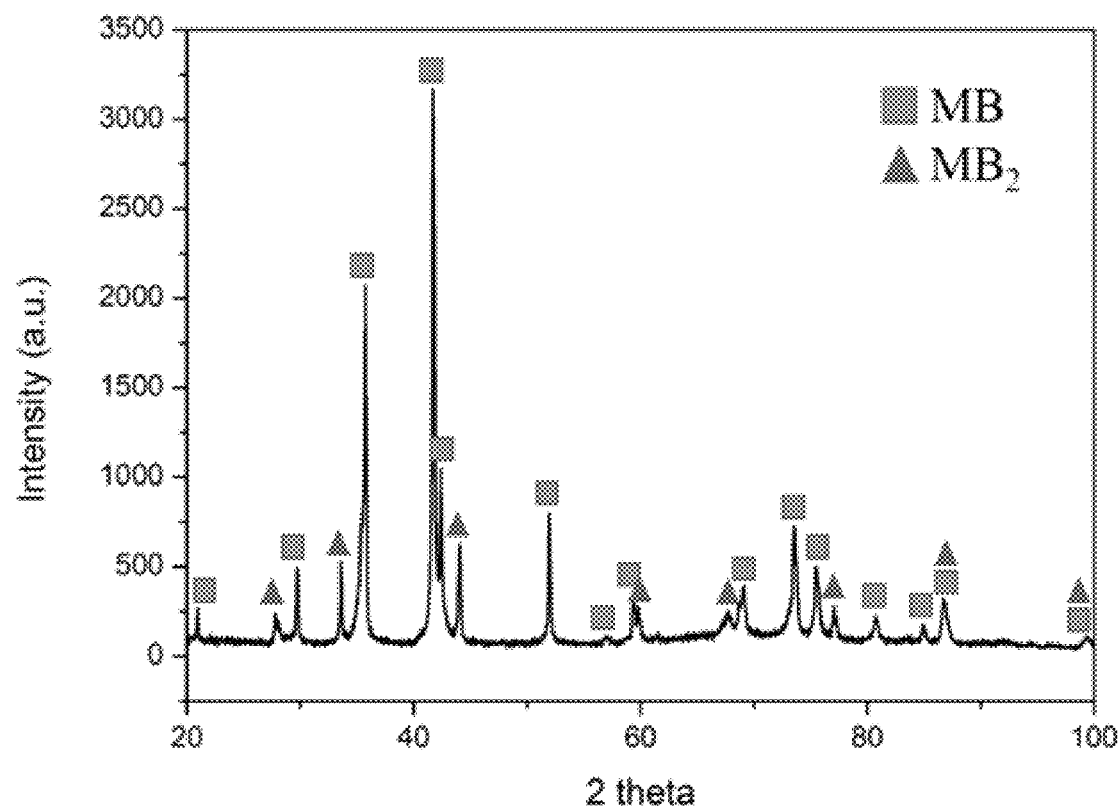
FIG. 6 is a schematic view of the XRD analysis of the toughened ceramic material according to the fifth embodiment of the disclosure.

The composition of the fifth embodiment (B4B5) is $[(NbB_2)(TaB_2)]_{0.6}W_{0.4}$, and the corresponding XRD analysis is shown in FIG. 6. Two peak patterns in FIG. 6 show that there are two phases of MB and $MB_2$. The fifth embodiment shows virtually nowhere the cemented phase and merely a pure ceramic structure with the hardness of 1996±81 HV and the fracture toughness of 6.06±0.24 MPa $m^{1/2}$.

Figure 7:
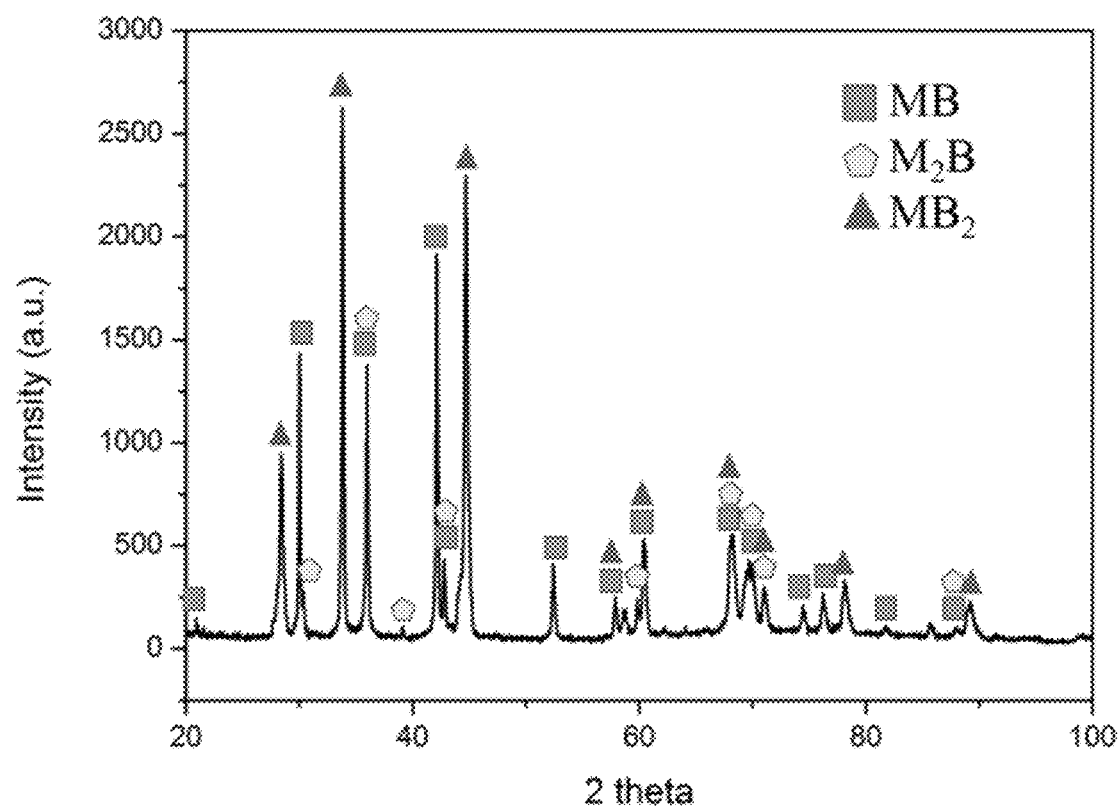
FIG. 7 is a schematic view of the XRD analysis of the toughened ceramic material according to the sixth embodiment of the disclosure.

The composition of the sixth embodiment (B4B6) is $[(NbB_2)(W_2B_5)]_{0.6}W_{0.4}$, and the corresponding XRD analysis is shown in FIG. 7. FIG. 7 shows three peak patterns indicative of three phases of $M_2B$, MB and $MB_2$, respectively. The hardness is 2165±28 HV, and the fracture toughness is 7.88±0.17 MPa $m^{1/2}$.

Figure 8:
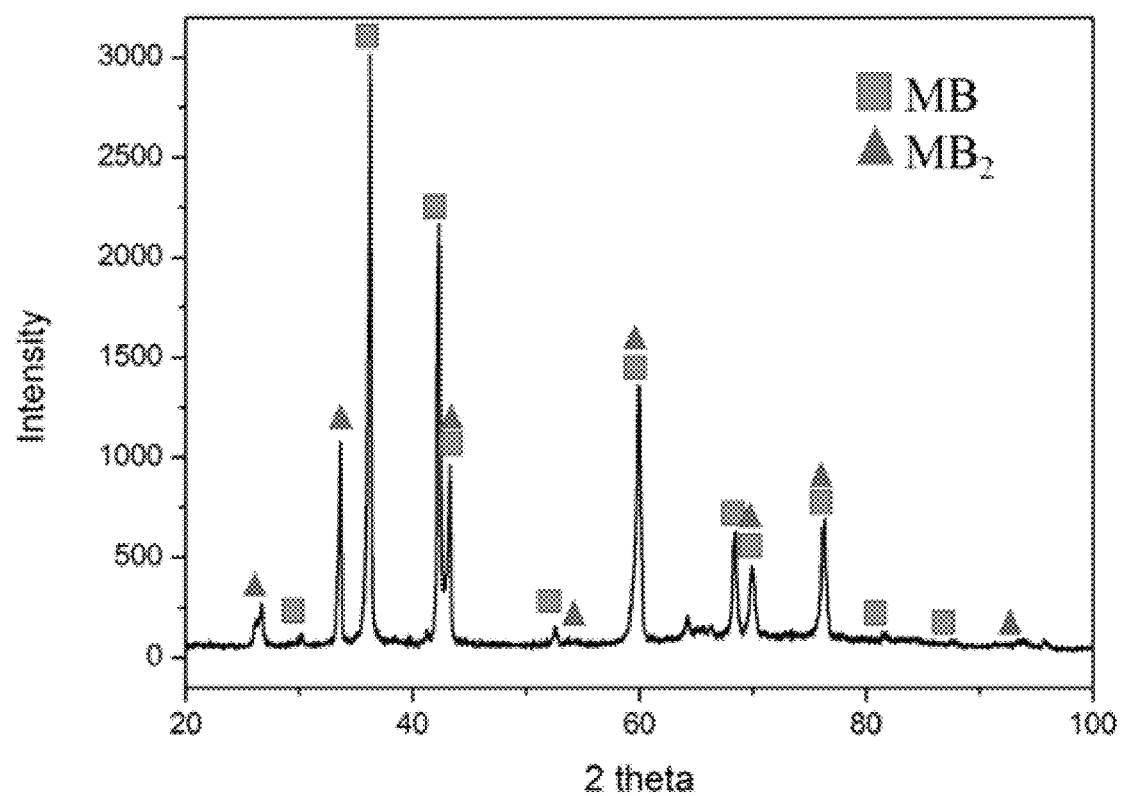
FIG. 8 is a schematic view of the XRD analysis of the toughened ceramic material according to the seventh embodiment of the disclosure.

$[(TiB_2)(ZrB_2)(HfB_2)(NbB_2)(TaB_2)(W_2B_5)_{0.5}]_{0.6}W_{0.4}$ is the composition of the seventh embodiment ((6B)6W4) and the corresponding XRD analysis is shown in FIG. 8 indicates there are two phases of MB and $MB_2$. The seventh embodiment has the hardness of 1841±87 HV, and the fracture toughness of 5.06±0.41 MPa $m^{1/2}$.

Figure 9:
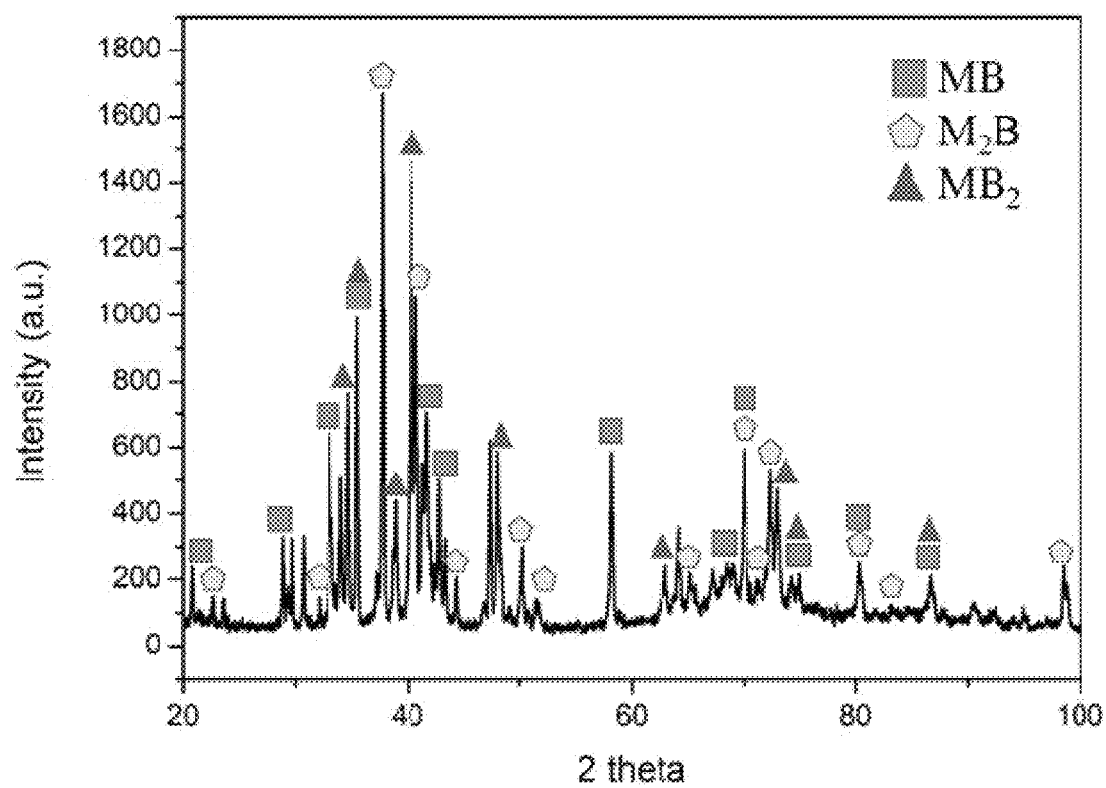
FIG. 9 is a schematic view of the XRD analysis of the toughened ceramic material according to the eighth embodiment of the disclosure.

The composition of the eighth embodiment (B3B4+W) is $[(HfB_2)(NbB_2)]_{0.4}W_{0.6}$, and the corresponding XRD analysis is shown in FIG. 9. Three peak patterns correspond to three phases of $M_2B$, MB and $MB_2$, respectively. Similarly, in the eighth embodiment, metallic cemented phase substantially appears nowhere once after most of W reacts and forms the hard and brittle phase while part of W forms MB. For the eighth embodiment the hardness is 1742±48 HV, and the fracture toughness is 6.88±0.44 MPa $m^{1/2}$.

Figure 10:
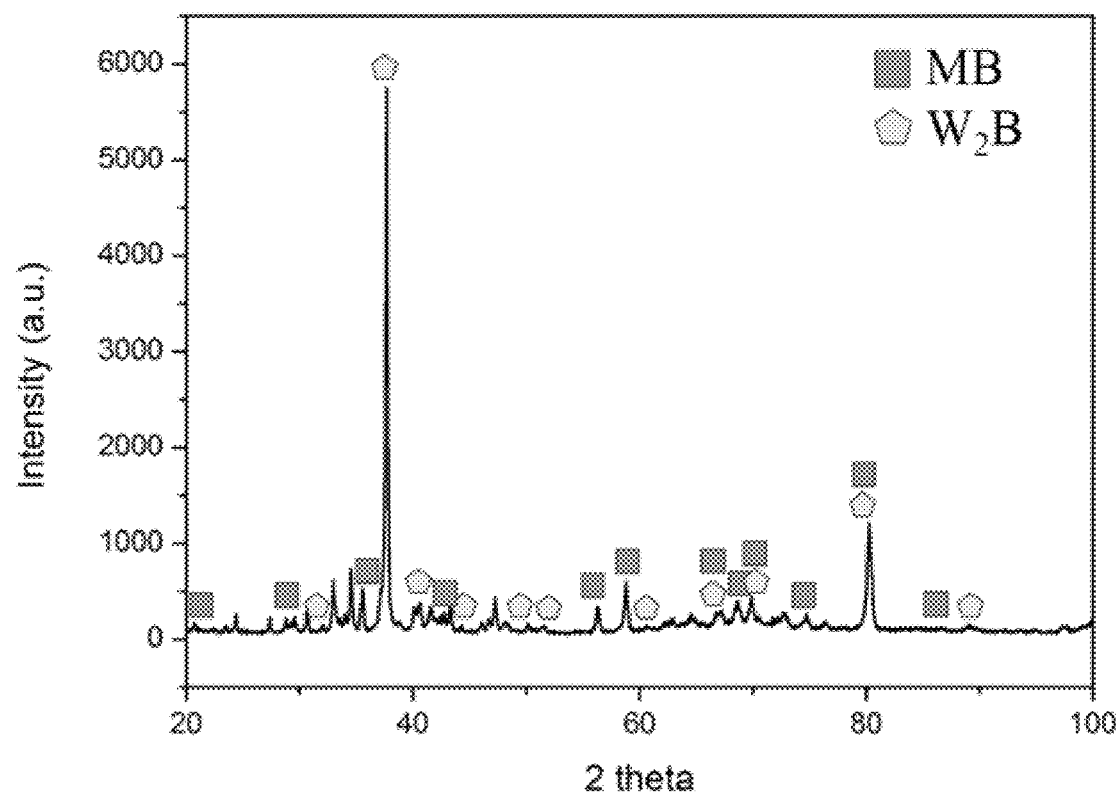
FIG. 10 is a schematic view of the XRD analysis of the toughened ceramic material according to the ninth embodiment of the disclosure.

The composition of the ninth embodiment (B3B5+W) is $[(HfB_2)(TaB_2)]_{0.4}W_{0.6}$, and the corresponding XRD analysis is shown in FIG. 10. Two patterns of peaks correspond to two phases of $W_2B$ and MB, respectively. In the ninth embodiment, there are no significant cemented phase residues, the hardness is 1863±66 HV, and the fracture toughness is 6.56±0.44 MPa $m^{1/2}$.

Figure 11:
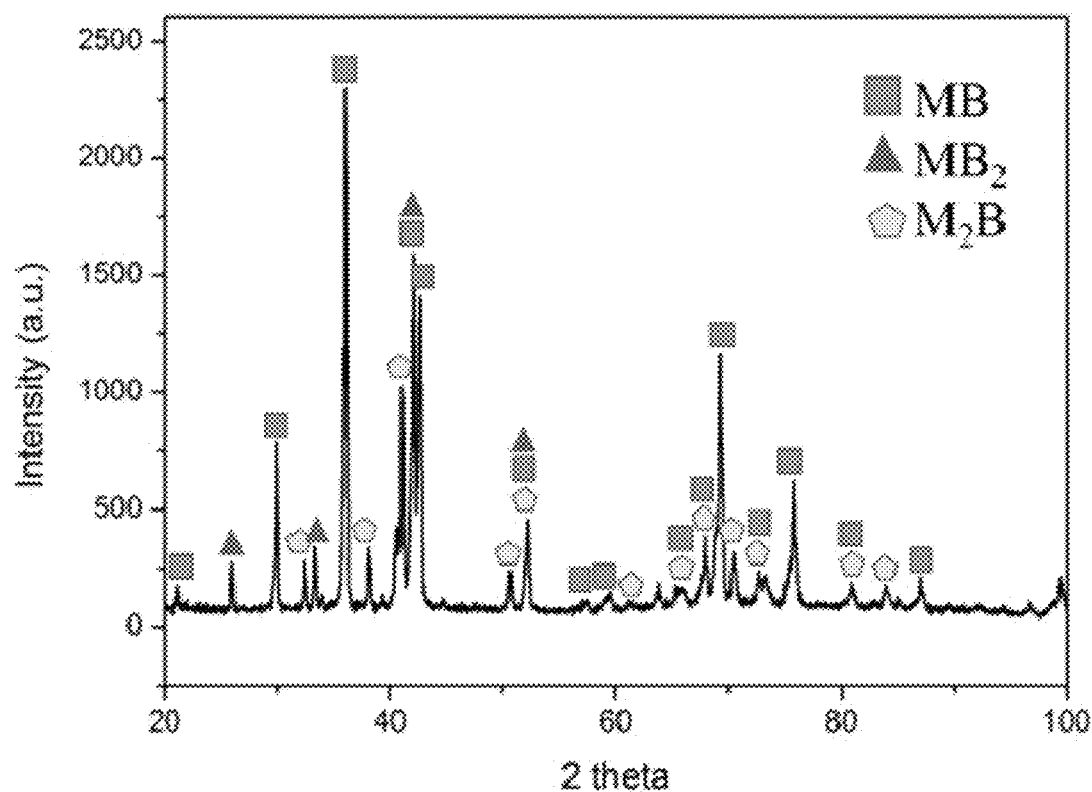
FIG. 11 is a schematic view of the XRD analysis of the toughened ceramic material according to the tenth embodiment of the disclosure.

$[(TiB_2)(ZrB_2)(HfB_2)(NbB_2)(TaB_2)]_{0.5}W_{0.5}$ is the composition of the tenth embodiment ((5B)5W5), and the corresponding XRD analysis is shown in FIG. 11 where three patterns of peaks correspond to three phases of $W_2B$, MB and $MB_2$, respectively. In the tenth embodiment, the hardness is 2076±56 HV, and the fracture toughness is 5.99±0.50 MPa $m^{1/2}$.

Figure 12:
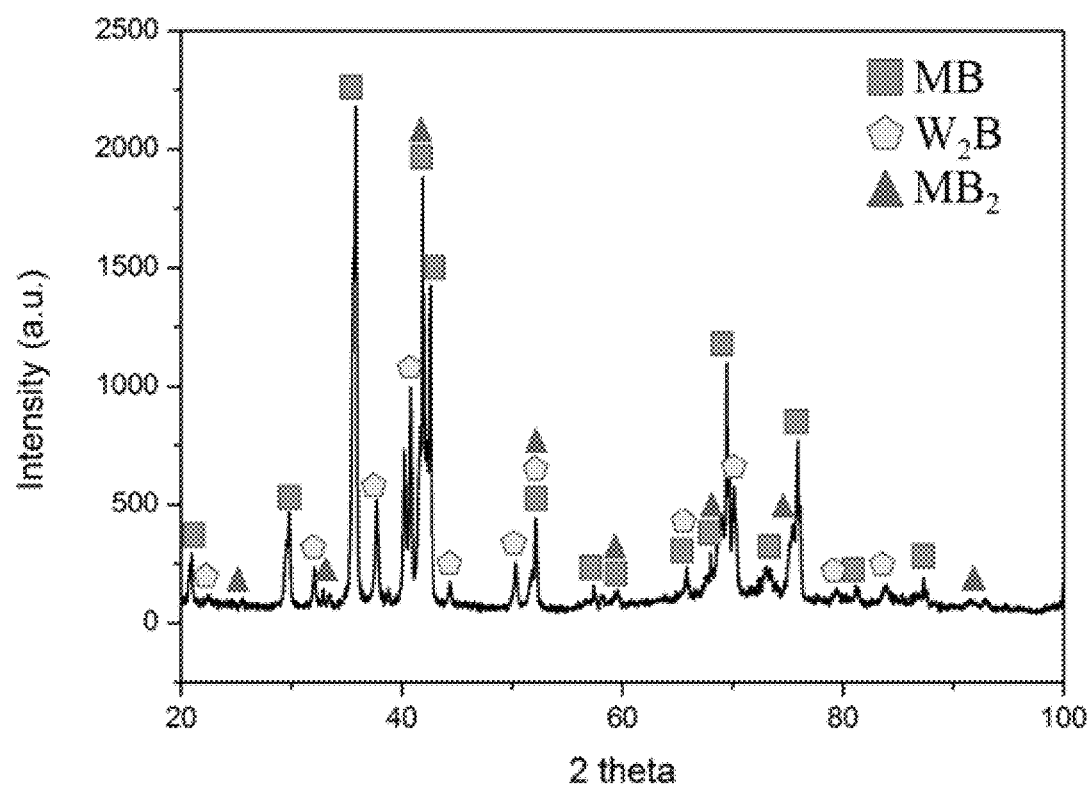
FIG. 12 is a schematic view of the XRD analysis of the toughened ceramic material according to the eleventh embodiment of the disclosure.

The eleventh embodiment ((4B)4W6) has $[(TiB_2)(ZrB_2)(NbB_2)(TaB_2)]_{0.4}W_{0.6}$ in composition and the corresponding XRD analysis is shown in FIG. 12 in which three patterns of peaks correspond to three phases of $W_2B$, MB and $MB_2$, respectively. The mechanical properties of the eleventh embodiment are similar to those of (5B)5W5, the hardness is 2045±47 HV, and the fracture toughness is 5.77±0.37 MPa $m^{1/2}$.

Figure 13:
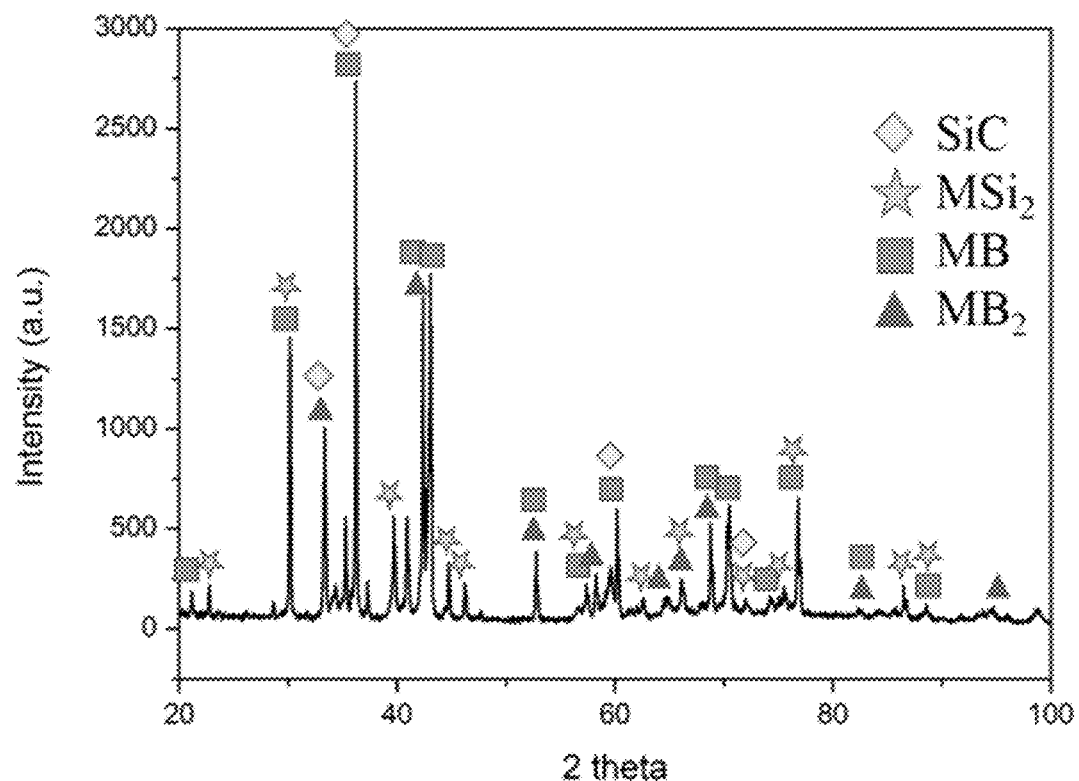
FIG. 13 is a schematic view of the XRD analysis of the toughened ceramic material according to the twelfth embodiment of the disclosure.

The twelfth embodiment (+SiC) has $[(TiB_2)(ZrB_2)(SiC)]_{0.6}W_{0.4}$ in composition and the corresponding XRD analysis is shown in FIG. 13 in which four patterns of peaks correspond to four phases of SiC, $MSi_2$, MB and $MB_2$, respectively. The specimen shows a hardness of 1898±65 HV, and the fracture toughness of 5.89±0.53 MPa $m^{1/2}$.

Figure 14:
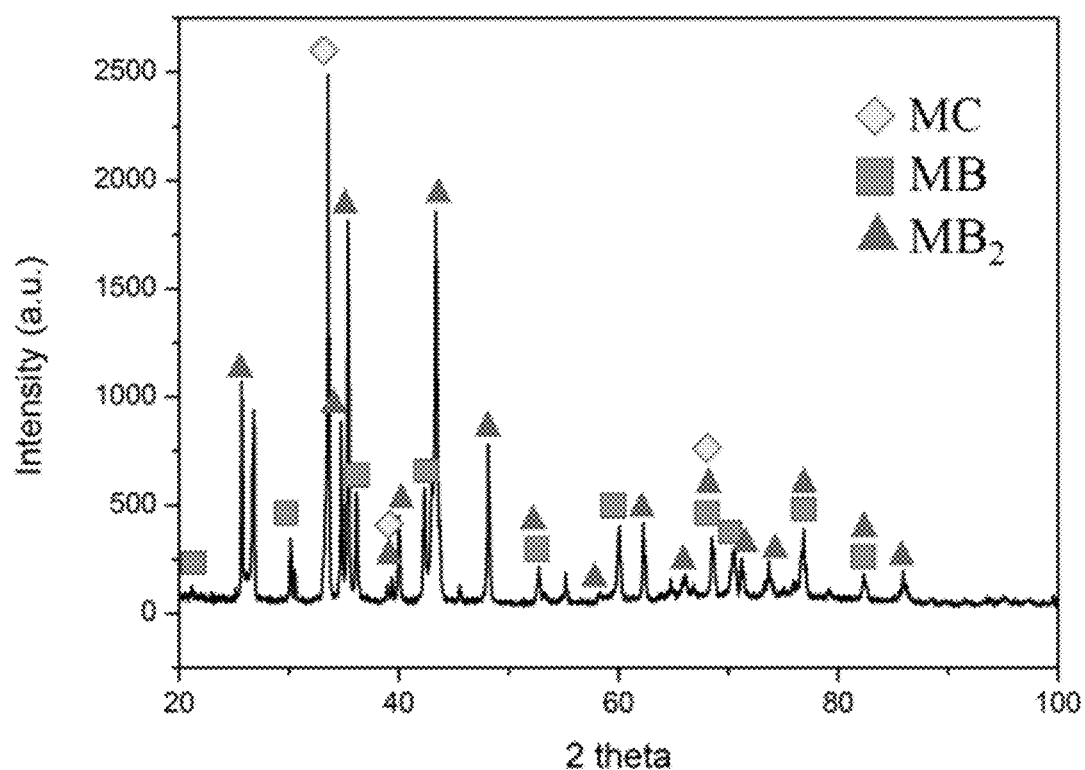
FIG. 14 is a schematic view of the XRD analysis of the toughened ceramic material according to the thirteenth embodiment of the disclosure.

The thirteenth embodiment (+$B_4C$) is $[(TiB_2)(ZrB_2)(B_4C)]_{0.6}W_{0.4}$, and the corresponding XRD analysis is shown in FIG. 14 where four peak patterns simply correspond to three phases of MC, MB and $MB_2$, respectively. In the embodiment, there are numerous coarse $MB_2$ phase and a small amount of MB phase present, because all the cemented phase of W reacts and forms the ceramic-like boride such that no metallic solid solutions appear.

Figure 15:
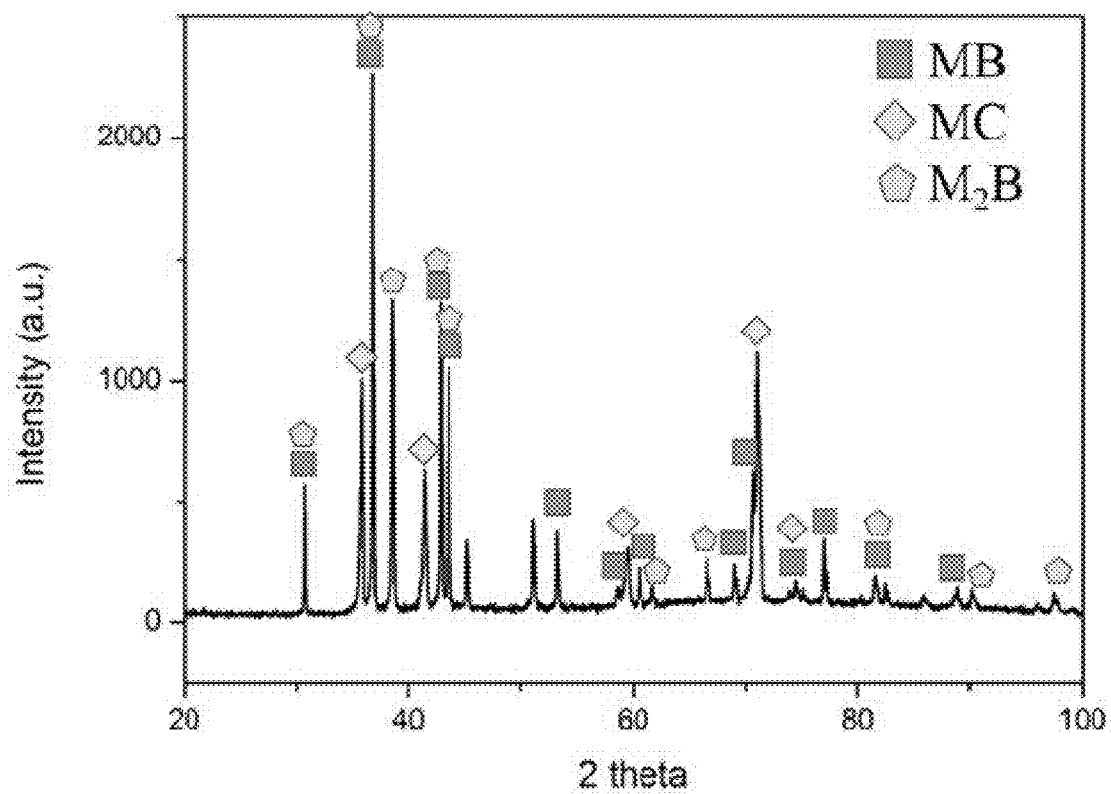
FIG. 15 is a schematic view of the XRD analysis of the toughened ceramic material according to the fourteenth embodiment of the disclosure.

[(TiC)(NbC)(TaC)(WC)(TiB$_2$)(ZrB$_2$)]$_{0.6}$W$_{0.4}$ is the fourteenth embodiment (+TZ), and its corresponding XRD analysis is shown in FIG. 15 where three peak patterns correspond to three phases of MC, MB and M$_2$B, respectively. In this embodiment, no cemented phases, W solid solutions, appear in microstructure, and there are no layered structures as in the original Nb—Ta series. There are only numerous dispersed particles of M$_2$B accompanied with MC therein. The hardness is 2203±83 HV, and the fracture toughness is 6.03±0.25 MPa m$^{1/2}$.

In the above embodiments, there are no metallic cemented phase residues in microstructure because there are many boron atoms in the composition. In addition, metallic cemented phase is reactive with boron, rendering the cemented phase W solid solution difficult to be present, and therefore resulting in the structure similar to pure ceramics.

As compared to traditional technologies, the toughened ceramic material of the disclosure has the following advantages:

1. According to the disclosure, the material is prepared by smelting. During the preparation of the toughened ceramic material, if the refractory metal can only react with the boride or/and the carbide at different planned composition ratios, metallic cemented phase appear virtually nowhere resulting in ae pure ceramic structure with a high toughness.

2. According to the disclosure, the toughened ceramic is a smelted material, and a higher density results in a better toughness. Thus, the hardness and the toughness of the prepared material improve, the hardness stability under high temperatures is better. Therefore, it is suitable for general industry.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A toughened ceramic material, comprising two borides, at least one carbide, and a refractory metal; wherein the said two borides are TiB$_2$ and ZrB$_2$; the said carbide is from the group of SiC, B$_4$C, TiC, NbC, TaC and WC; and the said refractory metal is tungsten, with a toughened ceramic material being prepared by smelting the two borides, the at least one carbide and the refractory metal together; and when the two borides, the at least one carbide and the refractory metal are heated and smelted, substantially all the refractory metal reacts with the two borides and/or the at least one carbide to form a pure ceramic structure without any metallic cemented phase.

* * * * *